United States Patent [19]

Brock

[11] 3,809,373

[45] May 7, 1974

[54] ASPHALT PREPARATION PLANT

[75] Inventor: James Donald Brock, Chattanooga, Tenn.

[73] Assignee: CMI Corporation, Oklahoma City, Okla.

[22] Filed: Mar. 10, 1972

[21] Appl. No.: 233,478

[52] U.S. Cl.................. 259/154, 209/129, 259/155
[51] Int. Cl. .............................................. B28c 7/04
[58] Field of Search ........... 259/146, 149, 154, 155, 259/156, 157, 158, 159; 55/DIG. 25; 209/129

[56] References Cited
UNITED STATES PATENTS

| | | | |
|---|---|---|---|
| 2,758,666 | 8/1956 | Prentiss | 55/DIG. 25 |
| 3,106,384 | 10/1963 | Preeman | 259/159 R |
| 3,625,488 | 12/1971 | Farnham | 259/154 |
| 1,240,481 | 9/1917 | Popkess | 259/158 |
| 2,188,798 | 1/1940 | Smith | 259/155 |
| 2,285,765 | 6/1942 | Carswell | 259/165 |
| 2,421,345 | 5/1947 | McConnaughay | 259/158 |
| 3,106,384 | 10/1963 | Preeman | 259/159 R |
| 3,614,071 | 10/1971 | Brock | 259/165 |

OTHER PUBLICATIONS

The Asphalt Handbook, July 1962 Ed., Manual Series No. 4, 2nd printing, published by The Asphalt Institute; TE 270 A65, 1962 (pp. 132, 177–179, 191–197).

Primary Examiner—Robert W. Jenkins
Attorney, Agent, or Firm—Dunlap, Laney, Hessin & Dougherty

[57] ABSTRACT

A continuous flow of aggregate is passed through a drying chamber and a flow of heated air is passed through the drying chamber to heat and dry the aggregate and to remove dust particles from the aggregate. The heavier and larger dust particles are separated from the air flow and accumulated, and the lighter and smaller dust particles in the air flow are charged with an electrostatic charge. The air flow with the charged dust particles is washed with hot bituminous liquid to coat the lighter dust particles with the liquid so that the dust particles are separated from the air flow and combined with the liquid flow. The flow of hot bituminous liquid, a flow of heavier dust particles, and the flow of hot dry aggregate are combined and the combined elements are conveyed to a mixer. The flows of hot bituminous liquid and dust are regulated in response to the weight of combined mix flowing toward the mixer.

5 Claims, 1 Drawing Figure

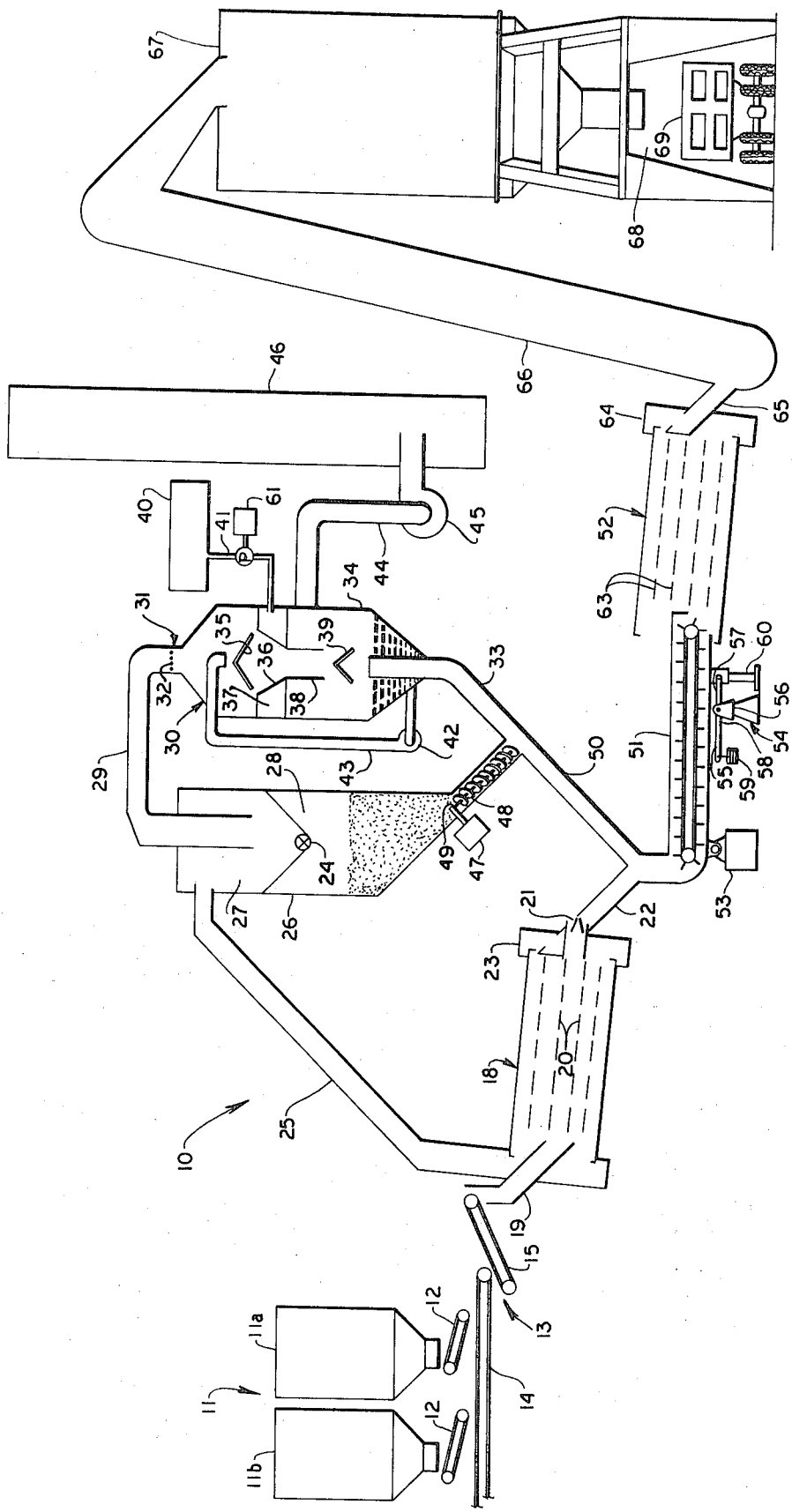

ASPHALT PREPARATION PLANT

BACKGROUND OF THE INVENTION

In the preparation of an asphalt mix for constructing highways or the like, an aggregate or stone filler is usually heated and dried and mixed with a hot bituminous liquid. The aggregate placed in the mix usually is graded by screening, etc., to provide the particular range of aggregate particle sizes in the asphalt mix which is desirable for the various construction purposes. In the prior art systems the aggregate has been dried at ground level and conveyed to an elevated structure where it is screened so as to be separated in accordance with particle sizes, and selected quantities of each range of particle sizes are combined together and fed in batches to a pug mill where the aggregate is mixed by a plurality of paddles with a hot bituminous liquid to form as asphalt mix. The batches of asphalt mix are subsequently dispensed to a transport vehicle below the elevated structure or fed to a conveyor and transported to an elevated storage silo for temporary storage and subsequent dispensing to a transport vehicle.

A typical asphalt preparation plant requires an expensive aggregate grading mechanism and pug mill which are usually stacked upon each other and elevated above ground level so that the aggregate can move in a downward direction under the influence of gravity as it is graded and dispensed to the pug mill and subsequently dispensed from the pug mill to the awaiting transport vehicle or to the inlet of the conveyor to the storage silo. The elevated asphalt preparation plant is expensive and cumbersome to assemble and operate. Moreover, dust is removed from the aggregate as the aggregate is dried and as the aggregate is segregated, and a substantial amount of the dust escapes to the atmosphere as an air pollutant.

SUMMARY OF THE INVENTION

Briefly described, the present invention comprises an asphalt mix preparation system which functions to continuously prepare asphalt mix and which includes an aggregate feed system which blends together and delivers graded aggregate from separate storage bins to an aggregate dryer at ground level where the continuous flow of aggregate is continuously heated and dried. Air for the aggregate dryer is passed through the dryer in the heating and drying process and removes aggregate dust particles from the flowing aggregate. The dust particles pass with the air flow to a centrifugal separator where the larger, heavier dust particles are separated from the air flow and temporarily stored. The air flow is subsequently passed to a second dust separator where the dust particles are subjected to an electrostatic charge and washed from the air flow with hot bituminous liquid. The hot bituminous liquid from the dust washer is combined with the heavier dust particles from the centrifugal separator and with the hot, dry aggregate from the dryer and conveyed to a mixer. The flow of hot bituminous liquid through the dust washer and the feeding of the heavier dust particles are regulated in response to the weight of aggregate, dust and liquid being delivered to the mixer. The mix continuously passes through the mixer and is conveyed to an elevated storage silo where batches of the mix are intermittently dispensed to transport vehicles for delivery to a construction site. The centrifugal separator and the dust washer function to remove substantially all of the dust from the air flow through the system so that the dust particles are not expelled to the atmosphere.

Thus, it is an object of the present invention to provide an asphalt mix preparation system which operates continuously to provide a high quality asphalt mix substantially without expelling aggregate dust particles to the atmosphere.

Another object of the present invention is to provide apparatus for preparing asphalt mix which is inexpensive to construct and to operate and which functions to combine the aggregate dust with the mix.

Other objects, features and advantages of the present invention will become apparent upon reading the following specification, when taken in conjunction with the accompanying drawing which is a schematic illustration of the asphalt mix preparation system.

DESCRIPTION OF A PREFERRED EMBODIMENT

Referring now in more detail to the drawing, asphalt preparation plant 10 comprises a plurality of aggregate supply bins 11 arranged in a row for the purpose of storing graded aggregate. For instance, supply bin 11a might contain a supply of aggregate having aggregate particles in a range of sizes between 1 inch and 1½ inches in diameter, while supply bin 11b might contain aggregate having particles in a size range between ½ inch and 1 inch in diameter, and the other supply bins (not shown) would contain aggregate having size ranges different from the size ranges in bins 11a and 11b. Each supply bin includes a discharge conveyor 12 at its lower end for feeding the aggregate from each bin onto conveyor system 13. The conveyors 14 and 15 of conveyor system 13 as well as discharge conveyors 12 can comprise conventional belt conveyors, drag chain conveyors, or any conventional continuous feed conveyor which allows each discharge conveyor to continuously feed aggregate from a supply bin onto conveyor 14 and conveyor 14 will continuously move the aggregate fed thereto below aggregate supply bins 11 onto the inclined conveyor 15.

Aggregate drying means are provided to receive the aggregate delivered by conveyor system 13. The aggregate drying means comprises aggregate dryer 18 which is of cylindrical configuration, rotatable about its longitudinal axis, and its longitudinal axis is disposed on an incline. The aggregate from the inclined conveyor 15 is discharged to stationary inlet chute 19 which is sloped downwardly from the upper end of conveyor 15 and extends into the upper end of aggregate dryer 18. Aggregate dryer 18 comprises a plurality of internal vanes 20 protruding inwardly thereof and which extend along its length. Heating means such as fuel oil burner 21 and discharge chute 22 are positioned at the lower end of the dryer. The diameter of dryer 18 is enlarged at its lower end at 23 so that the rotation of the enlarged end functions as a rotary elevator to lift the aggregate to a high level where it is received in the upper end of the downwardly inclined discharge chute 22.

Air flow conduit 25 communicates with the upper end of aggregate dryer 18 and with centrifugal dust separator 26. Centrifugal dust separator 26 functions as a dust separating means. Blower 45 induces a flow or air in an annular path inside upper collection chamber 27 so that the heavier dust particles accumulate in the lower portion of the chamber while the air and lighter or smaller dust particles continue to move with the air flow out of upper collection chamber 27 through second air flow conduit 29 toward dust separator or washer 30. Rotary air lock 24 separates upper collection chamber from lower storage chamber 28 and feeds the dust particles to the lower storage chamber.

The upper portion of dust washer 30 includes static electricity charge means 31 which comprises a grid 32 inside and extending across the upper portion of the housing and charged with high AC voltage such as approximately 900 volts, so as to set up a magnetic field in which the dust particles receive a negative charge as they flow thorugh dust washer 30. Dust washer 30 includes separator housing 34 and a plurality of fluid flow baffles including upper orifice cone or disc 35, lower converging conical baffle 36, annular weir 37 and downwardly extending discharge conduit 38. Hot bituminous liquid is ducted from supply 40 through conduits 41 into the upper portion of housing 34 to annular weir 37. Stand pipe 33 extends through the bottom wall of separator housing 34 up into the lower portion of the housing, and baffle 39 shields the upper open end of the stand pipe. The inlet of recirculating pump 42 communicates with the lower portion of separator housing 34 below the upper end of stand pipe 33, and recirculating pump 42 pumps hot bituminous liquid from the lower portion of separator housing 34 through conduit 43 and discharges the liquid onto the apex of upper orifice disc 35 in the upper portion of the housing. The hot bituminous liquid flows over the downwardly sloped outwardly diverging surface of orifice disc 35, and then from the upper disc onto the inwardly converging surface of the lower baffle 36. Also, the liquid from weir 37 flows over the annular weir onto the downwardly sloped conical surface of lower baffle 36, and the combined flows of bituminous liquid flow to the lower portion of separator housing 34, accumulate and overflow into the upper end of stand pipe 33 and are discharged through the stand pipe from housing 34. The air flowing from second air flow conduit 29 into separator housing 34 flows through a labyrinth formed by the plurality of fluid flow baffles, first diverging outwardly about the annular periphery of upper orifice disc 35, then converging inwardly to flow through lower baffle 36 and downwardly extending discharge conduit 38 into the lower portion of separator housing 34. The air is exhausted through conduit 44 into the inlet of blower 45 and flows in a centrifugal swirl in an upward direction through stack 46.

Storage chamber 28 of centrifugal dust separator 26 communicates with discharge conduit 48, and auger conveyor 49 driven by motor 47 is rotatable in conduit 48 to control the flow of the larger and heavier dust particles from chamber 28. Discharge conduit 48 and the lower end of stand pipe 33 converge together and their flows are combined in conduit 50. Conduit 50 is joined with the outlet of discharge chute 22 of aggregate dryer 18, and both feed to the inlet of conveyor 51.

Conveyor 51 is a drag chain conveyor and functions as a conveying means to move the combined flows of hot dry aggregate from aggregate dryer 18, hot bituminous liquid with entrained dust particles from dust washer 30 and heavier dust particles from centrifugal separator 26 to mixer 52. Conveyor 51 is pivotally supported at its inlet end by first support means 53 and is movably supported at its discharge end by second support means 54. Second support means 54 includes a lever arm 55 pivotally supported intermediate to its ends by fulcrum 56, and its shorter length 57 is connected to the housing of the conveyor while its longer length 58 is connected to counterweight 59. Counterweight 59 is of sufficient magnitude to balance the weight of conveyor 51, and load cell 60 functions to detect the amplitude of downward movement of conveyor housing 51 about first support means 53. Load cell 60 is electrically connected (not shown) to metering pump 61 of conduit 41 of hot bituminous supply 40 and to drive motor 47 of auger conveyor 49 and functions to control the flows of liquid and dust. For instance, when load cell 60 detects an increase in the weight of material being conveyed by conveyor 51 by the depression of the discharge end of the conveyor, load cell 60 provides a signal to metering pump 61 and to auger conveyor 49 so that more hot bituminous liquid from supply 40 is passed into liquid separator 30 and overflows into stand pipe 33 and more dust is fed from the chamber of centrifugal separator 26. Thus, load cell 60 functions as a control means for regulating the flows of hot bituminous liquid through liquid separator 30 and dust from centrifugal separator 26. Recirculating pump 42 operates continuously to recirculate the hot bituminous liquid through the dust washer so as to trap the dust particles in the air flow regardless of the weight of aggregate being handled by the system.

Mixer 52 functions as an asphalt mix mixing means and comprises an inclined rotatable cylinder having its upper end arranged to receive the discharge from conveyor 51. A plurality of inwardly projecting internal vanes 63 are located along the length of mixer 52, and an enlarged annular portion 64 is positioned at the lower outlet end of the mixer and functions as a rotary elevator. Discharge chute 65 receives the asphalt mix elevated by the enlarged annular portion 64 and the mix moves down the incline of discharge chute 65 to the inlet end of upwardly inclined conveyor 66. Conveyor 66 is a drag chain conveyor and functions continuously to move the hot asphalt mix to the upper end of storage silo or surge hopper 67. Storage hopper 67 is elevated above ground level and defines a transport vehicle loading station 68 therebelow, so that transport vehicles, such as dump truck 69, can move below the storage hopper and have the hot asphalt mix dispensed thereto by a gravity discharge system.

OPERATION

In the operation of the asphalt preparation plant 10, the aggregate supply bins 11 contain graded aggregate, usually with each bin containing aggregate in a different size range. The aggregate will be fed from the supply bins 11 by the discharge conveyor 12 of each supply bin onto the conveyor system 13. The operation of the discharge conveyors 12 will be regulated so as to provide the proper blend of aggregate particle sizes to the asphalt preparation plant, as required by the type road construction, etc., that is desired.

The conveyor system 13 continuously delivers the blend of aggregate to the upper end of aggregate dryer 18. Aggregate dryer 18 rotates about its longitudinal axis so that the aggregate is vigorously tumbled by vanes 20 and caused to move or flow down the incline of the aggregate dryer toward discharge chute 22. Blower 45 at the outlet of dust washer 30 functions to induce a flow of air from the atmosphere into the lower end of aggregate dryer 18, through the dryer 18, through air flow conduit 25, into centrifugal dust separator 26, through second air flow conduit 29, through dust washer 30, and out the upper end of stack 46. Fuel oil burner 21 produces an exposed flame inside aggregate dryer 18, and the air flowing through and about burner 21 is heated by the burner and its flame. The hot air as well as the radiation of heat from the burner flame functions to heat and to dry the aggregate tumbling along the length of aggregate dryer 18. Also, dust particles in the mass of aggregate flowing to dryer 18 are separated from the aggregate particles by the vigorous tumbling of the aggregate in the dryer and by the air flowing through the dryer, and the separated dust particles become entrained with the air flow. When the aggregate is discharged from aggregate dryer 18 through discharge chute 22, it is hot and dry.

The air flow and its entrained dust particles are delivered to centrifugal dust separator 26 where the dust particles and air swirl in an annular path before the air is discharged upwardly from the center of the swirl through second air flow conduit 29. The heavier or larger dust particles are separated from the air flow by centrifugal force and move to the bottom of separator chamber 27, through rotary air lock 24 and then to lower storage chamber 28 where the dust particles are temporarily stored in a mass.

The lighter or smaller dust particles remaining with the air flow pass through second air flow conduit 29 toward dust washer 30. As the smaller dust particles move through static electricity charge means 31, the grid 32 which is charged with AC voltage functions to induce a magnetic field and charge the entrained dust particles, thus charging the dust particles with a charge of static electricity. As the dust particles and air flow enter housing 34 of liquid separator 30, the air flow makes several abrupt changes in direction as it passes through the labyrinth of passages, and since the dust particles entrained in the air flow are heavier than the air itself, the dust particles tend to contact the surfaces of liquid separator 30. The first abrupt change in direction of the air flow is encountered at upper disc 35 which is washed or bathed with grounded hot bituminous liquid from the lower portion of separator housing 34 and recirculating pump 42. A large percentage of the dust particles entrained with the air tends to impinge against upper disc 35 by resisting a change in direction of movement and is thereupon coated with the hot bituminous liquid and removed from the air flow. In addition, the charge of static electricity received by the dust particles causes the dust particles to be attracted to the grounded hot bituminous liquid and to the grounded upper disc. As the air flow again abruptly changes direction to flow about the periphery of upper disc 35, any dust particles remaining entrained in the air flow again tend to resist the abrupt change of direction and impinge against the supply of hot bituminous liquid at weir 37 at the upper peripheral edge of lower baffle 36, and against the upper surface of lower baffle 36.

A curtain or spray of hot bituminous liquid flows off the periphery of upper disc 35 and falls to the lower baffle 36 so that the air passes through the shower of liquid and any dust particles remaining with the air flow must also pass through the liquid. This further tends to coat the dust particles with the liquid. When the air flow reaches the lower outlet of discharge conduit 38 another abrupt change in the path of the air is encountered as the air turns and flows toward conduit 44. Another shower or screen of liquid is formed at the lower end of discharge conduit 38 and the air and any dust carried therewith must again pass through the liquid screen before leaving dust washer 30.

The hot bituminous liquid and the smaller or lighter dust particles captured therein accumulate in the lower portion of separator housing 34 and overflow the upper end of stand pipe 33 and then pass through conduit 50 toward the inlet of conveyor 51. The rate at which bituminous liquid and dust overflow into stand pipe 33 is controlled by the rate of the supply of bituminous liquid from supply 40 and pump 61. Recirculating pump 42 operates continuously while the system is in use so as to provide a continuous shower of hot bituminous liquid to dust washer 30. Thus, even when the system is first started up or when the supply of aggregate to the dryer 18 has been temporarily interrupted and is subsequently continued, the shower of hot bituminous liquid in dust washer 30 will function to remove the dust particles from the air stream. Auger conveyor 49 of centrifugal separator 26 rotates to feed heavier dust particles to conduit 50 where the heavier dust particles are coated with the hot bituminous liquid from dust washer 30. The hot bituminous liquid then carries both the heavier and lighter dust particles and moves to the inlet of conveyor 51 where it is combined with the flow of hot dry aggregate from aggregate dryer 18. The combined flows of hot aggregate, dust particles and hot bituminous liquid move through conveyor 51 toward asphalt mixer 52.

As the combined flows of hot aggregate, dust and hot bituminous liquid move along conveyor 51, the weight of the combined flows is detected by load cell 60 which functions to control the speeds of operation of metering pump 61 and auger conveyor 49 and to regulate the flow of hot bituminous liquid from supply 40 to dust washer 30 and to regulate the flow of dust from dust storage chamber 28 of centrifugal separator 26. Thus, if there is any increase or decrease in the weight of aggregate received from dryer 18, the change in weight will be detected and the flows of hot bituminous liquid and dust will be regulated accordingly so that the ratio of aggregate from dryer 18, heavier dust particles from centrifugal separator 26 and hot bituminous liquid from supply 40 will be substantially constant even though the weight of aggregate delivered from dryer 18 varies.

The combined flows received from conveyor 51 in mixer 52 are vigorously tumbled in mixer 52 by the rotation of the mixer about its longitudinal axis, and the materials move down the incline of the mixer and are eventually discharged from the mixer through discharge chute 65.

The asphalt mix discharged from mixer 52 is elevated through conveyor 66 to the upper end of storage hopper 67 and temporarily stored until dispensed to a transport vehicle 69.

Centrifugal dust separator 26 is effective to remove from the air flow therethrough substantially all of the dust particles larger than 30 microns in diameter. Also, approximately 60 percent of the dust particles of a diameter between 30 and 10 microns are removed in the centrifugal separator. The dust particles remaining in the air flow pass to dust washer 30. The dust washer, when functioning without static electricity charge means 31, will remove substantially all of the dust particles of a diameter more than 10 microns and removes approximately 90 percent of the dust particles between 10 and 5 microns. Approximately 50 percent of the dust particles between 5 and 1 microns in diameter are removed in dust washer 30 and a significant but unknown percentage of the dust particles below 1 micron are also removed in dust washer 30. When static electricity charge means 31 is functioning, practically all detectable dust particles are attracted to the hot bituminous mix and are therefore removed from the air expelled from the system to the atmosphere.

While this invention has been described in detail with particular reference to a preferred embodiment thereof, it will be understood that variations and modifications can be effected within the spirit and scope of the invention as described hereinbefore and as defined in the appended claims.

I claim:

1. Apparatus for continuously preparing an asphalt mix or the like comprising a heated aggregate drying chamber, means for passing a flow of aggregate through said heated aggregate drying chamber, air flow means for passing a flow of air through said heated aggregate drying chamber to remove moisture and dust particles from the aggregate flowing through said drying chamber, first separating means for separating heavier dust particles from the flow of air, second separating means for separating lighter dust particles from the flow of air and for combining the lighter dust particles with a flow of hot bituminous liquid, means for combining the flow of hot bituminous liquid and its lighter dust particles, the larger dust particles and the flow of hot aggregate from said heated aggregate drying chamber, weighing means for continuously weighing the combined flow of liquid, dust and aggregate, control means responsive to changes in weight detected by said weighing means for varying the flow of hot bituminous liquid to said second separating means, and mixing means for mixing together the aggregate, dust and bituminous liquid.

2. The apparatus of claim 1 and wherein said second separating means comprises means for charging the lighter dust particles with an electrostatic charge.

3. The apparatus of claim 1 and further including an elevated storage silo defining a transport vehicle loading station therebelow, and conveying means for conveying the mix from the mixing means to the upper end of said storage silo.

4. An asphalt mix preparation plant comprising an aggregate dryer including a cylinder rotatable about its longitudinal axis and with its longitudinal axis disposed on an incline, means for continuously feeding aggregate into the upper end of said dryer so that the aggregate flows down the incline of and through said dryer, heating means, means for passing an air flow about said heating means and in one end of said dryer and out the other end of said dryer so that the aggregate flowing through said dryer is heated and dried and aggregate dust particles are removed from the aggregate and moved with the air flow, centrifugal separating means for separating heavier dust particles from the air flow and temporarily storing the heavier dust particles, liquid separating means for washing the lighter dust particles from the air flow with a flow of hot bituminous liquid, means for combining the flow of hot bituminous liquid from said liquid separating means, heavier dust particles from said centrifugal separating means and the flow of hot aggregate from said dryer, a mixer, conveyor means for receiving and conveying the combined liquid, dust and aggregate to said mixer, and means responsive to the weight of the conveyed combined liquid, dust and aggregate for regulating the flow of hot bituminous liquid to said liquid separating means.

5. In combination, a high voltage electrical grid, a dust washer including means for flowing hot bituminous liquid therethrough, and means for directing a flow of dust laiden air first through said electrical grid and then through said dust washer whereby the dust in the air flow receives an electrostatic charge as it passes through said grid and the dust subsequently is attracted to the hot bituminous liquid in said dust washer.

* * * * *